Dec. 15, 1953   J. M. HEAPS ET AL   2,662,763
WIND BOX FOR SINTERING MACHINES
Filed March 30, 1951
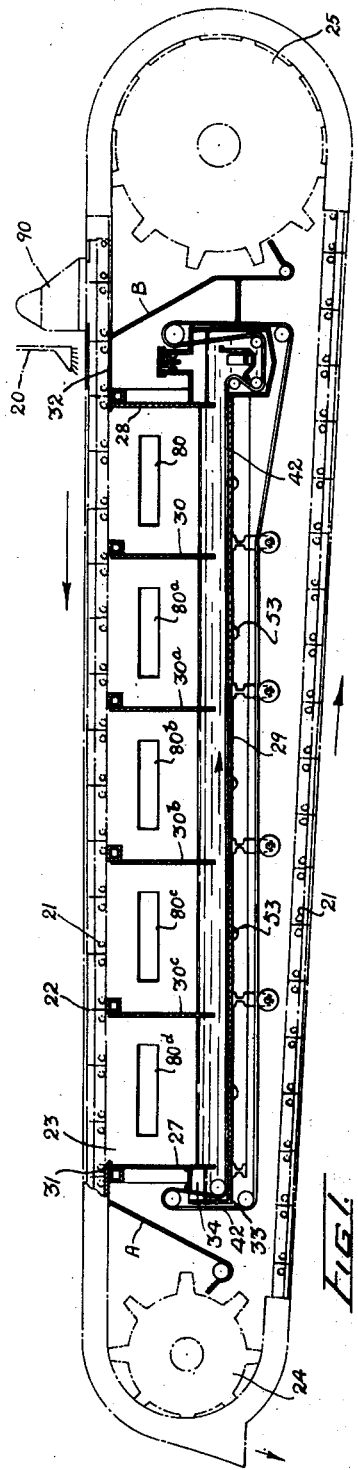
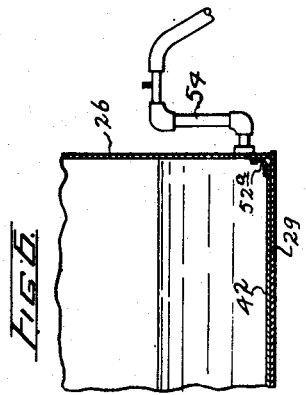
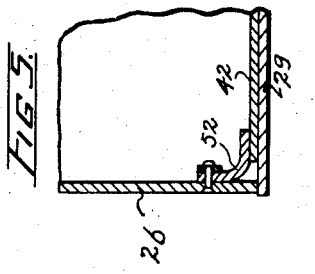
INVENTORS
J.M.HEAPS
B.HOULDEN
PER
ATTORNEY.

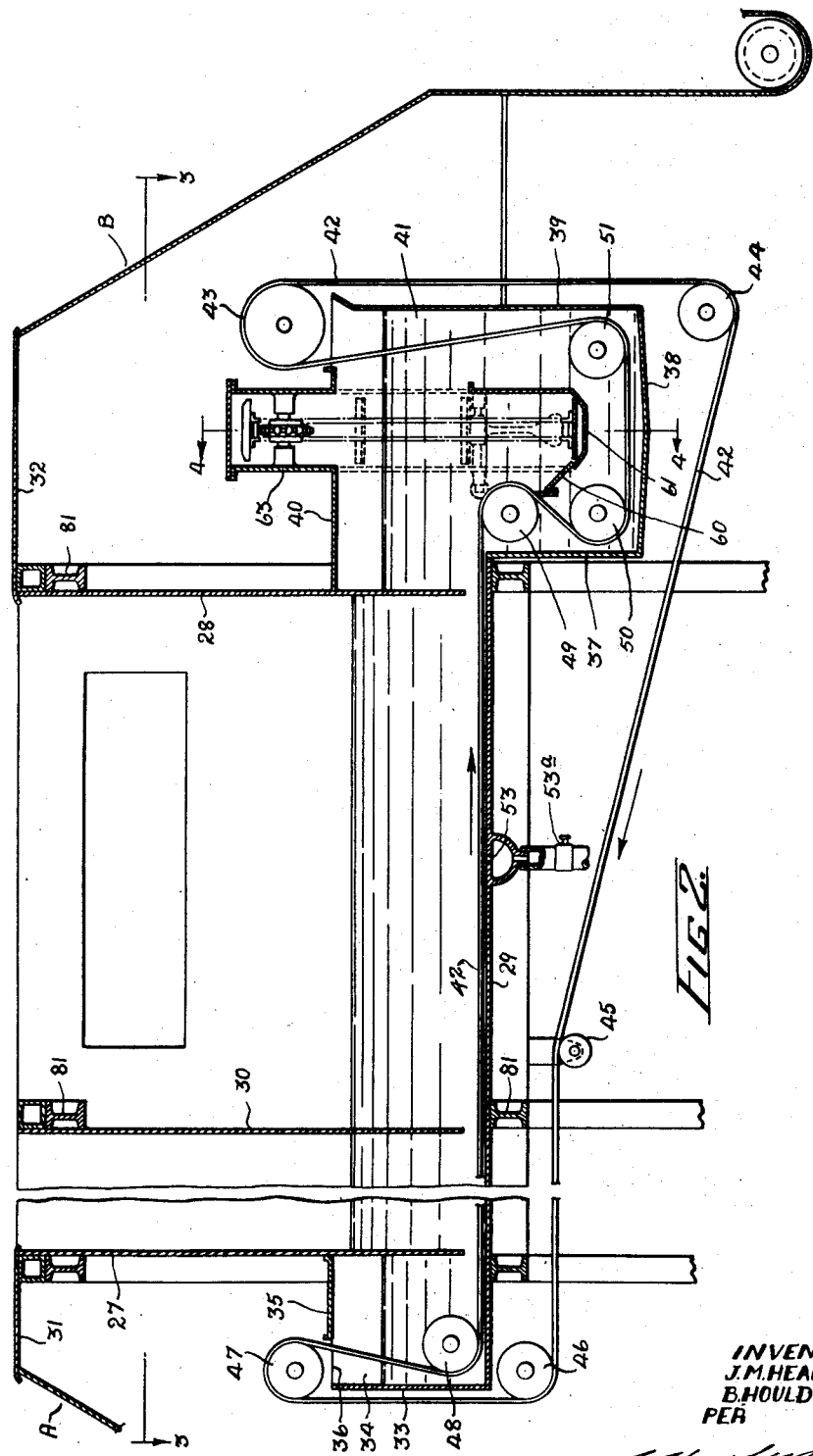

Dec. 15, 1953     J. M. HEAPS ET AL     2,662,763
WIND BOX FOR SINTERING MACHINES
Filed March 30, 1951     4 Sheets-Sheet 3
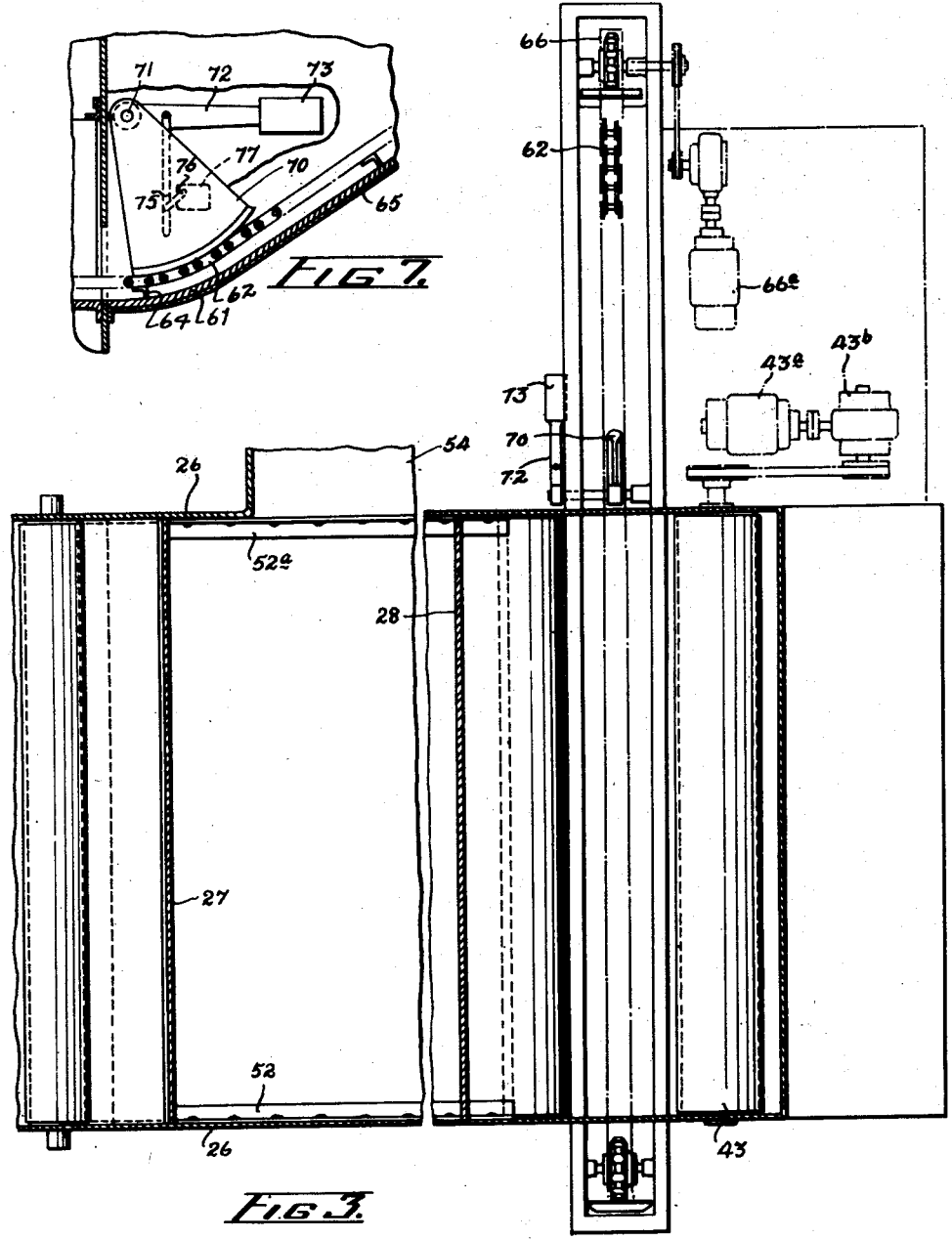
INVENTORS
J.M. HEAPS
B. HOULDEN
PER
ATTORNEY Dec. 15, 1953     J. M. HEAPS ET AL     2,662,763
WIND BOX FOR SINTERING MACHINES
Filed March 30, 1951                    4 Sheets-Sheet 4
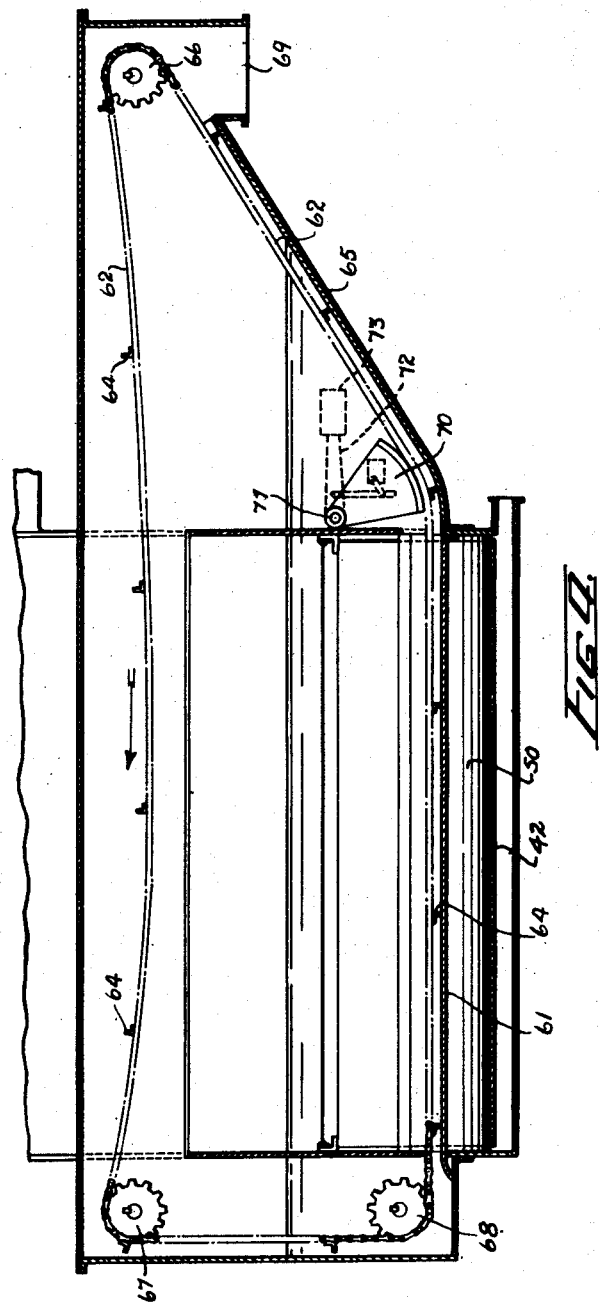
INVENTORS
J. M. HEAPS
B. HOULDEN
PER
ATTORNEY.

Patented Dec. 15, 1953

2,662,763

UNITED STATES PATENT OFFICE

2,662,763

WIND BOX FOR SINTERING MACHINES

John Morton Heaps, Trail, British Columbia, and Basil Houlden, Rossland, British Columbia, Canada, assignors to The Consolidated Mining and Smelting Company of Canada, Limited, Montreal, Quebec, Canada, a corporation of Canada Application March 30, 1951, Serial No. 218,494

10 Claims. (Cl. 266—21)

This invention relates to improvements in sintering machines.

Straight line, down draft sintering machines are well known and are widely used for roasting and sintering mineral ores and concentrates. Such machines consist essentially of a frame, and supported on the frame, the wind or suction box, the feed mechanism, the ignition device, a pair of spaced, endless track elements, the grates or pallets which are mounted on the track elements and which carry the charge, and the driving mechanism. The charge is distributed by the feeding mechanism in a relatively thin layer on the pallets which are advanced in sequence below the ignition device and over the wind or suction box to the discharge end of the machine. The wind or suction box is connected to a suitable suction device, such as a high-vacuum, centrifugal fan, which draws air through the particles of the charge and into and out of the wind box to promote the combustion of the charge, initiated by the ignition device, for the removal of sulphur as sulphur dioxide and for the production of a porous, agglomerated mass suitable for charging to a blast furnace.

A difficulty encountered in the operation of straight line, down draft sintering machines is that particles of the charge, particularly finely divided particles of dust, are drawn through the grate bars, which form the bottoms of the pallets, into the wind box wherein they accumulate to the extent that the machine must be stopped periodically to permit cleaning the wind box. The importance of this difficulty is emphasized in the roasting of certain lead concentrates wherein some particles of the charge may be reduced, by reducing agents present in the charge, to metallic lead. The lead so formed may pass to the wind box to form large cakes or chunks which are very difficult to remove. When treating such concentrates, it may be necessary to suspend sintering operations at frequent intervals to allow manual cleaning of the wind box.

Various expedients have been suggested to overcome this problem such as by maintaining a bath of water in the wind box, commonly known as a "wet" wind box, to granulate any material reporting therein. Such wet wind boxes have the difficulty that they require constant supervision to prevent excessive accumulation of material, and they do not overcome the objections to manual operations.

An important object of this invention is to provide improvements in the wind boxes of down draft sintering machines whereby material, such as particles of the charge, which has fallen or has been drawn into the wind box is continuously removed from the wind box to prevent the accumulation of such material.

The wind box or suction box for a down draft sintering machine of the present invention comprises, in general, an open top, end walls, side walls and a bottom, at least one air outlet in the upper part of said wind box, conveyor means extending from end to end of said wind box adjacent to and substantially covering the bottom thereof, and means communicating with the discharge end of said conveyor for removing from said wind box, material discharged from said conveyor and means for sealing said wind box against passage of air thereinto other than through said top and passage of air therefrom other than through said air outlet.

An understanding of the manner in which the above and other objects of the invention are attained may be had from the following description, reference being made to the accompanying drawings, in which:

Figure 1 is a side elevation, partly in section, of a straight line, down draft sintering machine embodying the improvements of the present invention;

Figure 2 is an enlarged side elevation of the wind box assembly;

Figure 3 is a top plan view;

Figure 4 is an enlarged section taken along the line 4—4 of Figure 2; and

Figures 5, 6 and 7 are enlarged detail views.

Like reference characters refer to like parts throughout the specification and drawings.

Referring to the drawings, the improvements of the present invention are illustrated as incorporated or embodied in the wind box of a straight line, down draft sintering machine of the type well known as the Dwight-Lloyd design and which comprises in general, a heavy structural steel frame, a feed mechanism 19, an ignition device 20 positioned above and adjacent to the feed end of the machine, a pair of endless track elements 21 on which the grates or pallets 22 are mounted and a suction or wind box indicated generally by the numeral 23. The pallets 22 are moved on the track elements 21 by sprockets 24—25, one of which is driven according to conventional practice.

The wind box 23 is a generally rectangular structure and is defined by side walls 26, end walls 27 and 28, and bottom or floor 29. Vertically disposed partitions 30—30a—30b—30c extend from the top of the wind box to a short distance, preferably only a few inches, above the bottom and are spaced at more or less regular intervals to divide the wind box into sections. Each section of the wind box is provided with an air outlet 80—80a—80b—80c and 80d connected to a suitable suction device, such as a high vacuum centrifugal fan. These air outlets are positioned below the top of the wind box but well above the bottom to permit maintaining an adequate bath of water in the wind box below the air outlets as described in detail hereinafter.

The wind box is carried by the supporting frame, the transverse horizontal columns of which are indicated by the numeral 81 and is positioned between the ignition device and the discharge end of the machine.

The upper ends of the end walls 27—28 are joined to the dead plates 31—32 respectively which are employed to seal the wind box against any air leakage as the individual pallets leave or approach the ends of the wind box and are joined to the side walls in a manner such as to prevent any flow of air into the wind box other than the air drawn through the grates of the pallets.

Each end wall 27—28 extends vertically downwardly from its respective dead plate to a point a short distance above the bottom 29. The bottom extends a short distance beyond the end wall 27 at the discharge end of the machine and terminates at a vertically disposed wall 33 which extends upwardly a short distance to form a well 34 defined by the wall 33, the lower part of the end wall 27 and a top horizontally disposed wall 35 which is secured to the wall 27 and extends toward but stops short of the wall 33 leaving an opening 36 which provides an inlet opening for the collector belt described in detail hereinafter. The top 35 of the well 34 is positioned above the normal level of the bath of water maintained in the wind box.

The bottom 29 also extends a short distance beyond the end wall 28 adjacent to the feed end of the machine and terminates at a vertically disposed downwardly extending wall 37. A well 41, which is positioned below the feed end of the machine and extends beyond the end wall 28, is defined by the side wall 37 which extends downwardly from the end of the bottom 29, a horizontally disposed bottom or floor 38 and a vertical side wall 39 which is spaced from the side wall 37 and which extends upwardly to a point substantially above the lower end of the end wall 28 and above the normal level of the bath of water maintained in the wind box, and a horizontally disposed top 40 provided with openings through which the collector belt and the discharge conveyor are extended.

The lower ends of the end walls 27—28 and the partitions 30—30a—30b—30c are spaced above the bottom 29 a distance sufficient for the passage of a conveyor belt and the load thereon and also to permit the passage of other objects, such as pallet grate bars, as may fall into the wind box.

A belt conveyor 42 extends through the lower part of the wind box below the lower ends of the end walls 27 and 28 and the partitions 30—30a—30b—30c, being passed into the wind box through opening 36 in the well 34 and passed out of the wind box through an opening in the top 40 of the well 41, to return, exteriorly of the wind box, to the port of entry at the opening 36. This conveyor belt 42 is extended over a transversely mounted driving pulley 43 driven by a motor 43a through a speed reducing gear box 43b and positioned exteriorly of the wind box, and is passed alternately under and over idler pulleys 44, 45 and 46 positioned exteriorly along the length of the wind box and passes over an idler pulley 47 which guides it into the opening 36 and under idler pulley 48, positioned adjacent to the corner formed by the intersection of the bottom 29 and the wall 33, which guides it along the bottom of the wind box to an idler pulley 49 positioned in the well 41 adjacent to the wall 37. The upper surface of the pulley 49 is horizontally in alignment with the lower surface of the pulley 48. The belt passes around an idler pulley 50, positioned below the pulley 49, around a pulley 51 adjacent to the wall 39 and horizontally in alignment with the pulley 50 thence upwardly to pass over the driven pulley 43.

The belt 42 is preferably in the form of a rubber covered conveyor belt of a width sufficient to cover the bottom 29 of the wind box and is sealed at the edges along the side walls by a flexible skirt 52—52a to prevent fine material from passing between the edges of the belt and the adjacent side walls.

Water is supplied to the wind box through slots 53 which extend transversely of the width of the bottom 29 at spaced intervals, for example, one water inlet slot for each wind box section. This water, admitted into the wind box under pressure, serves to lubricate the underside of the belt to prevent wear between the rubber belt covering and the steel bottom and the upward current aids in preventing any fine material from settling downwardly under the belt. The supply of water to the wind box may be regulated by the valves 53a provided in water supply lines to the slots 53.

The desired level of the bath of water in the wind box is maintained relatively constant by the provision of an overflow pipe 54, the height to which the water rises in the wind box being determined by the height of the vertical section of the overflow pipe. The water level is maintained a substantial distance above the passages below the lower ends of the end walls 27—28 and the partitions but below the openings in the tops of the wells 34 and 41 to leave a relatively large air space in the upper part of the wind box. The water level in the wells 34 and 41 is somewhat lower than in the wind box, as the wind box is under less than atmospheric pressure and the wells are under atmospheric pressure. Preferably, the water level in the well 41 is maintained a sufficient distance below the top of the inclined side 65 to permit the cleanings to drain before they are discharged from the well.

An apron or chute 60 is positioned below and extends transversely of the idler roll 49 immediately below the point at which the belt 42 discharges its load as it passes over the roll. The apron 60 extends to the bottom 61 of the housing 63 of the discharge conveyor 62 which conveys or drags the material discharged into the bottom of the housing 63 to a point of discharge, such as a chute 69, exterior of the wind box.

The discharge conveyor 62 is preferably in the form of a chain conveyor, such as a rivetted pintle chain, fitted with transverse scrapers 64 adapted to move on the bottom 61 and the inclined side 65 of the housing 63.

The discharge conveyor housing is an elongated frame formed with a horizontally positioned bottom 61 positioned above the portion of the belt 42 extended between the idler rolls 50—51 and below the idler roll 49 and spaced therefrom so that material discharged from the belt on to the apron 60 flows freely thereto. The bottom 61 extends horizontally under the apron 60 and is then inclined upwardly, as indicated by the numeral 65, to extend through an opening in the top 40 of the well 41 to terminate at a point immediately below a transverse driving sprocket 66 over which the chain conveyor is extended. Idler sprockets 67 and 68 are positioned at opposite sides of the rearward end wall of the frame and the chain conveyor is extended over and between the driving sprocket 66 and the idler sprockets 67 and 68 which are positioned such that the unattached ends of the scrapers 64 are in contact with the bottom and inclined walls which, preferably, are formed of wear resistant material such as relatively heavy steel plate.

A guide element 70 is mounted transversely of the chain conveyor, such as adjacent to the point of intersection of the horizontal and the inclined bottom walls of the frame. This guide element may be in the form of a segment of a circle mounted on a shaft 71. A counterweighted arm 72 is also mounted on shaft 71. The guide is designed and mounted to rest on and hold the chain conveyor against the floor of the casing. Also, provision may be made to employ the guide to act as a limit switch to cut off the power to the driving sprocket in the event of undue accumulation of material in the frame, or in the event of an object, such as a pallet grate bar, becoming jammed against the casing or the guide. The guide may be mounted for restricted pivotal movement under greater than a predetermined pressure and the movement employed to trip a limit switch. Alternatively, a contact 75 normally out of engagement with the contact 76 of the limit switch 77 may be mounted on the arm 72 which, in turn, may be mounted for restricted movement under a greater than predetermined pressure. In this latter embodiment, the arm 72 is in the form of a lever counterweighted by weights 73 which serve to hold the guide in its normal operative position. If the conveyor becomes overloaded or jammed, the load on the shaft 71 increases to the extent that the lever 72 is raised to close the contacts 75—76 which actuates the limit switch to stop the driving sprocket motor 66a. The limit switch may also be connected to stop movement of the collector belt 42 and of the pallets 22.

In the operation of a sintering machine embodying the wind box of the present invention, a bath of water of relatively constant volume is maintained in the lower part of the wind box with the surface of the bath being maintained below the tops 35 and 40 of the wells 34 and 41 but well above the lower ends of the end walls 27 and 28 and the partitions 30, 30a, 30b, 30c thus to provide inlet and outlet ports for the collector belt and the drag conveyor which are sealed against the leakage of air. In practice, the level of the water in the wells 34 and 41 is lower than the level in the wind box.

The two end wells 34 and 41 provide a water reservoir to allow for changes in water level in the wind box. The maximum height to which the water can rise is determined by the height of the overflow pipes 54.

The wind box of the present invention possesses a number of important advantages. Material drawn through the pallet grate bars settles on the collector belt and is continuously withdrawn from the wind box thus effecting important savings in the operating time which, in turn, effects important savings in operating costs. These advantages are gained without any interference to the normal efficiency of the sintering machine.

It will be understood, of course, that modifications may be made in the preferred embodiment of the invention described and illustrated herein without departing from the scope of the invention defined by the appended claims. For example, the belt conveyor 42 may be mounted to operate in the same direction as the pallets. This would place the discharge well 41 and the discharge conveyor 62 at the discharge end of the sintering machine.

What we claim as new and desire to protect by Letters Patent of the United States is:

1. A wind box for a down draft sintering machine which comprises an open top, side walls, end walls and a bottom, at least one air outlet in the upper part of said wind box, belt conveyor means within said walls and below said outlet extending from end to end of said wind box adjacent to and substantially covering the bottom thereof, means for driving said belt conveyor, means communicating with the discharge end of said conveyor for removing from the wind box material discharged from said conveyor, and means for sealing said wind box against passage of air thereinto other than through said open top and passage of air therefrom other than through said air outlet.

2. A wind box for a down draft sintering machine which comprises an open top, side walls, end walls and a bottom, at least one air outlet in the upper part of said wind box, belt conveyor means within said walls and below said outlet extending from end to end of said wind box adjacent to and substantially covering the bottom thereof and returning from an exit port adjacent to one end of said wind box exterior of the wind box to a point of entry adjacent to the opposite end, means for driving said belt conveyor, means communicating with the discharge end of said conveyor for removing from the wind box material discharged from said conveyor, and means for sealing said wind box against passage of air thereinto other than through said open top and passage of air therefrom other than through said air outlet.

3. A wind box for a down draft sintering machine which comprises an open top, side walls, end walls and a bottom, the lower part of said wind box being adapted to receive a bath of water, an air outlet in the upper part of said wind box, belt conveyor means within said walls and below said outlet extending from end to end of said wind box adjacent to and substantially covering the bottom thereof, means for driving said belt conveyor, conveyor means communicating with the discharge end of said belt conveyor and extending to a point exterior of said wind box, and means for sealing said wind box against passage of air thereinto other than through said open top and passage of air therefrom other than through said air outlet.

4. A wind box for a down draft sintering machine which comprises an open top, side walls, end walls and a bottom, the lower part of said wind box being adapted to receive a bath of water, and an air outlet in the upper part of said wind box, water inlet ports extending transversely of said bottom at spaced intervals, a water outlet port and means for regulating the flow of water from the wind box, belt conveyor means within said walls and below said outlet extending from end to end of said wind box adjacent to and substantially covering the bottom thereof, means for driving said belt conveyor, conveyor means communicating with the discharge end of said belt conveyor and extending to a point exterior of said wind box, and means for sealing said wind box against passage of air thereinto other than through said open top and passage of air therefrom other than through said air outlet.

5. A wind box for a down draft sintering machine which comprises an open top, side walls, end walls and a bottom, the lower part of said wind box being adapted to receive a bath of water, and an air outlet in the upper part of said wind box, water inlet ports extending transversely of said bottom at spaced intervals, belt conveyor means within said walls and below said outlet extending from end to end of said wind box adjacent to and substantially covering the bottom thereof, the underside of said belt conveyor being lubricated by water from said inlet ports, means for driving said belt conveyor, conveyor means communicating with the discharge end of said belt conveyor and extending to a point exterior of said wind box, and means for sealing said wind box against passage of air thereinto other than through said open top and passage of air therefrom other than through said air outlet.

6. A wind box for a down draft sintering machine which comprises an open top, side walls, end walls and a bottom, the lower part of said wind box being adapted to receive a bath of water, an air outlet in the upper part of said wind box, belt conveyor means within said walls and below said outlet extending from end to end of said wind box and substantially covering the bottom thereof, means for closing the space between the longitudinal edges of said belt conveyor and the side walls of said wind box, means for driving said belt conveyor, conveyor means communicating with the discharge end of said belt conveyor and extending to a point exterior of said wind box, and means for sealing said wind box against passage of air thereinto other than through said open top and passage of air therefrom other than through said air outlet.

7. A wind box for down draft sintering machines having a feed end and a discharge end which comprises an open top, side walls, end walls and a bottom, the lower part of said wind box being adapted to receive a bath of water, transverse partitions at spaced intervals adapted to divide said wind box into sections, said partitions extending downwardly towards but stopping short of said bottom, an air outlet in the upper part of each section, a belt conveyor within said walls and below said outlet having a discharge end under the feed end of the sintering machine extending from end to end of said wind box adjacent to and substantially covering the bottom thereof below the lower ends of said partitions, conveyor means communicating with the discharge end of said belt conveyor and extending to a point exterior of said wind box, and means for sealing said wind box against passage of air thereinto other than through said open top and passage of air therefrom other than through said air outlet.

8. A wind box for down draft sintering machines having a feed end and a discharge end which comprises an open top, side walls, end walls and a bottom, the lower part of said wind box being adapted to receive a bath of water, transverse partitions at spaced intervals adapted to divide said wind box into sections, said partitions extending downwardly towards but stopping short of said bottom, an air outlet in the upper part of each section, a belt conveyor within said walls and below said outlet having a discharge end under the feed end of the sintering machine extending from end to end of said wind box adjacent to and substantially covering the bottom thereof below the lower ends of said partitions, conveyor means communicating with the discharge end of said belt conveyor and extending to a point exterior of said wind box, means for driving said last mentioned conveyor means, and means actuated by an overload on said last mentioned conveyor for stopping its driving means, and means for sealing said wind box against passage of air thereinto other than through said open top and passage of air therefrom other than through said air outlet.

9. A wind box for down draft sintering machines which comprises an open top, side walls, end walls and a bottom, an air outlet in the upper part of the wind box, the lower part of said wind box being adapted to receive a bath of water, an extension at each end of the lower part of said wind box defined by an outer vertical wall, a spaced inner vertical wall extending downwardly towards but stopping short of the bottom of the wind box, and a horizontally disposed top having at least one opening therein, said top being spaced substantially above the lower end of said inner wall, a belt conveyor within said walls and below said outlet extending from end to end of said wind box adjacent to and substantially covering the bottom thereof, said belt conveyor being guided into the opening in the top of one of said extensions and guided out of the top of the other extension, said belt conveyor having a discharge point in one of said extensions, and conveyor means in communication with said discharge point and extending to a point exterior of said wind box, and means for sealing said wind box against passage of air thereinto other than through said open top and passage of air therefrom other than through said air outlet.

10. A down draft sintering machine comprising a wind box having an open top, side walls, end walls and a bottom and adapted to contain a bath of water, an air outlet in the upper part of the wind box, a conveyor within said walls and below said outlet extending from end to end of the wind box and substantially covering the bottom thereof and having a discharge end within the wind box adjacent to one end thereof, means for driving said conveyor, and means communicating with the discharge end of said conveyor for removing material discharged therefrom to the exterior of the wind box.

JOHN MORTON HEAPS.
BASIL HOULDEN.

References Cited in the file of this patent

UNITED STATES PATENTS

| Number | Name | Date |
|---|---|---|
| 1,039,706 | Dellwik | Oct. 1, 1912 |
| 1,350,440 | Davis | Aug. 20, 1920 |
| 2,037,990 | Martin | Apr. 21, 1936 |
| 2,043,719 | Telgmann | June 9, 1936 |

FOREIGN PATENTS

| Number | Country | Date |
|---|---|---|
| 249,372 | Great Britain | Mar. 25, 1926 |